United States Patent [19]
Johns

[11] Patent Number: 5,586,846
[45] Date of Patent: Dec. 24, 1996

[54] PORTABLE DOWEL BORING TOOL

[76] Inventor: Joseph J. Johns, 11384 Jeb Stuart La., Culpeper, Va. 22701

[21] Appl. No.: 610,697

[22] Filed: Mar. 4, 1996

Related U.S. Application Data

[63] Continuation-in-part of Ser. No. 442,158, May 16, 1995, abandoned.

[51] Int. Cl.$^6$ ............................................. B23B 45/14
[52] U.S. Cl. ..................... 408/72 R; 408/112; 408/115 R
[58] Field of Search ............................. 408/72 R, 72 B, 408/112, 115 R, 115 B, 239 A, 1 R

[56] References Cited

U.S. PATENT DOCUMENTS

| 2,170,211 | 8/1939 | Osborne | 408/72 R |
| 2,597,152 | 5/1952 | Kornmayer | 408/72 R |
| 2,798,520 | 7/1957 | Maskulka et al. | 408/72 R |
| 3,362,447 | 1/1968 | Elder, Jr. | 408/112 |
| 3,788,759 | 1/1974 | Grunert | 408/115 R |
| 3,907,452 | 9/1975 | Tripp | 408/72 B |
| 3,973,784 | 8/1976 | Smith | 408/239 A |
| 5,076,742 | 12/1991 | Lee et at. | 408/112 |
| 5,217,331 | 6/1993 | Ericksen | 408/112 |
| 5,419,662 | 5/1995 | Ericksen | 408/112 |

Primary Examiner—Steven C. Bishop
Attorney, Agent, or Firm—Sheldon H. Parker

[57] ABSTRACT

The dowel-hole boring device drills dowel receiving holes at a predetermined angle and depth. The device has a body with a first and second end. A first interior channel opens to the first end and a second interior channel, contiguous to the first channel, opening to the second end. The first interior channel has a diameter less than the second interior channel, the reduction in diameter forming a step. A pair of bearings have an interior diameter slightly greater than the shaft and an exterior diameter slightly less that than of the first interior channel. The shaft is configured to prevent rotation within the bearings. The shaft has a drill bit at one end and a recess at the other. The body of the shaft has a receiving groove to receive a securing ring. A spring, over the shaft, maintains the separation between the bearings at a predetermined distance. Locking channels and locking screws come in contact with the bearings locking them in place. The shaft is axially movable within the bearings. A guide panel is proximate the second end.

16 Claims, 3 Drawing Sheets

PORTABLE DOWEL BORING TOOL

This application is a continuation-in-part of U.S. Ser. No. 08/442,158 filed May 16, 1995, now abandoned.

BACKGROUND OF THE INVENTION

1. Field of the Invention

The instant invention discloses a portable dowel-hole boring tool for use in combination with a portable electric drill.

2. Brief Description of the Prior Art

Dowels are frequently used to join two pieces of wood, or other material, together. Although this has become easier in machine shops with the availability of large machinery, this machinery is not available to the small shop or use in the field. The need to have an accurate portable tool for the drilling of dowel-holes has been recognized in the art through a number of patents.

In U.S. Pat. No. 2,170,211 to Osborne, the problem is addressed wherein a spring is used in a housing. The Osborne device utilizes a single bushing to guide the drill bit. The device does not, however, provide an upper bushing or bearing to prevent the drill bit from side to side movement. During part of the procedure it appears that the spring will prevent movement in the upper housing, however once the drill bit has descended far enough to extend past the skirt, horizontal movement can be encountered.

A cutting tool adaptor is disclosed in U.S. Pat. No. 3,973,784 to Smith to convert a screwdriver to a drill and back to a screwdriver without changing tools. This device, however, provides no guidance to the drill bit and would not assist in boring a hole at a predetermined angle.

A Hinge Drilling Jig is disclosed by Lee et al in U.S. Pat. No. 5,076,742 for use in face-frameless cabinet construction. The drilling jig of Lee et al does not provide any means to prevent side to side movement of the drill bit.

SUMMARY OF THE INVENTION

The instant invention provides an accuracy which has not been heretofore achievable in the prior art, individually or in combination. One of the critical features in obtaining accuracy are the two bearings. As disclosed herein the spacing between the bearings provides not only a stability but a method of automatically achieving the correct hole depth. The Osborne patent utilizes only one bearing which therefore allows for at least minimal side to side movement. Therefore, even if the Osborne device was combined with the Lee et al device, the drill bit would still have a certain amount of lateral movement.

The instant invention provides the ability to accurately align a straight dowel hole using a portable device. The dowel-hole boring tool, as disclosed, uses a pair of bearings locked into the body of the boring tool to prevent any side to side movement of the drill bit.

The dowel-hole boring device drills dowel receiving holes at a predetermined angle. The device has a body with a first end and a second end. A first interior channel opens to the first end and a second interior channel is contiguous to the first channel, opening to the second end. The first interior channel has a diameter less than the second interior channel, the reduction in diameter forming a step. A pair of bearings have an interior diameter slightly greater than the shaft and an exterior diameter slightly less that than of the first interior channel. The shaft is configured to fit within the interior diameter of the bearings to prevent the shaft from rotating within the bearings. The shaft further has a drill bit receiving area at one end, containing a drill bit and a swivel head having a recess, such as a standard hexagon, at the other end. The drill bit is secured in the shaft with a set screw. The body of the shaft has a receiving groove to receive a securing ring. A spring returns the shaft inside the body of the tool, after a hole has been bored. Locking channels extend, at right angles, from the exterior of the body to the first interior channel. Locking screws extend through the locking channels, coming in contact with the pair of bearings, thereby locking the bearings in place. The shaft is axially movable within the bearings. One of the bearings is adjacent the step.

A guide panel is proximate the second end. The guide panel can be at an angle to or on the same plane as the second end. The guide panel can be removably attached to the body or a solid part thereof.

BRIEF DESCRIPTION OF THE DRAWINGS

The advantages of the instant disclosure will become more apparent when read with the specification and the drawings, wherein.

DETAILED DESCRIPTION OF THE INVENTION

Figure 1:
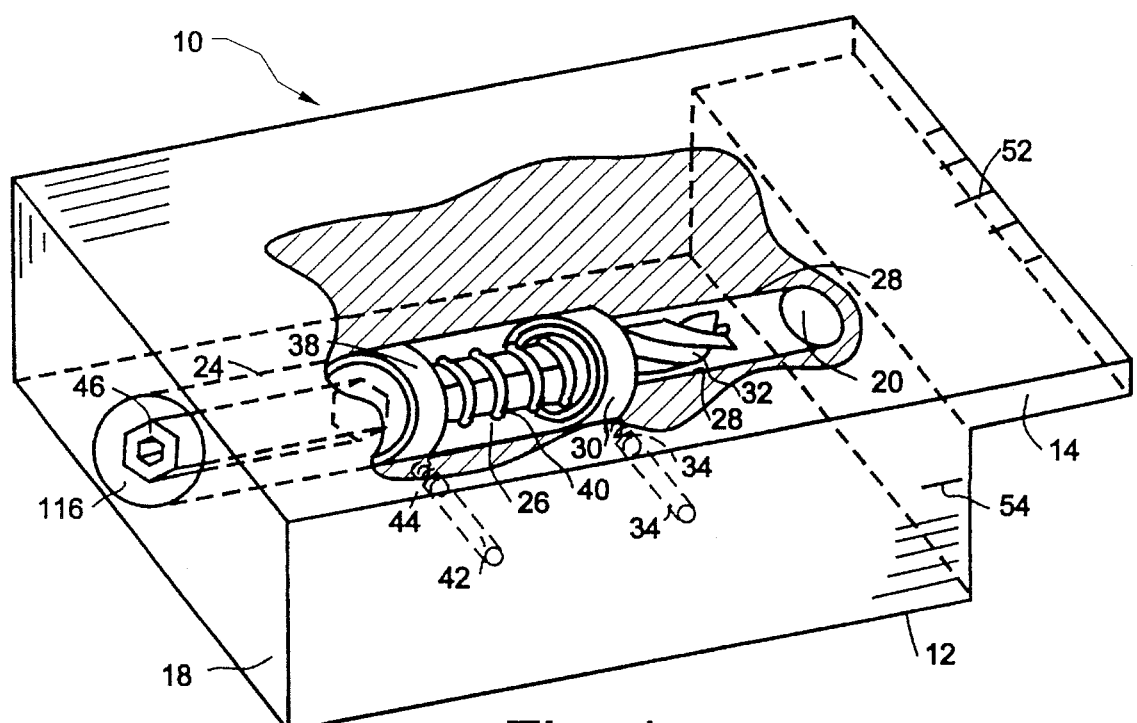
FIG. 1 is a cut away perspective view of the portable dowel-hole boring tool.
Figure 2:
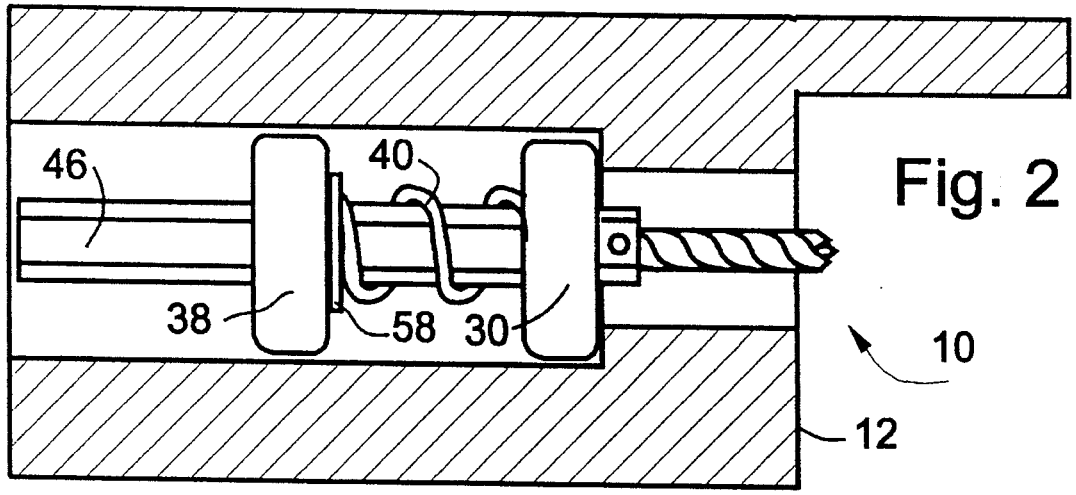
FIG. 2 is a cut away side view of the boring tool.
Figure 3:
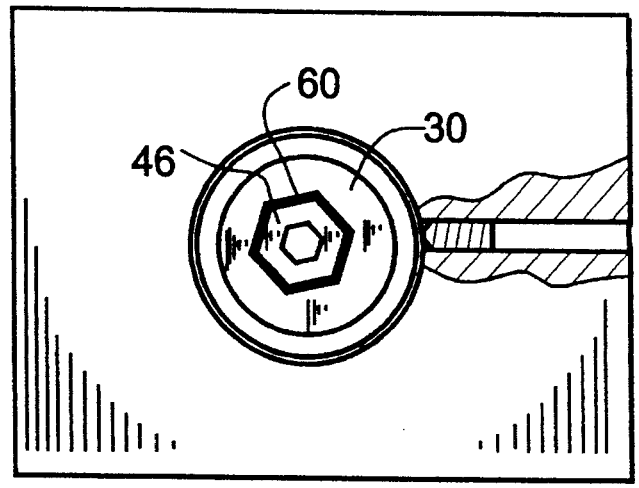
FIG. 3 is a top view of the boring tool showing the set screw and shaft/bearing tolerance.

The dowel-hole boring tool 10 as illustrated in FIGS. 1, 2 and 3, allows for accurate dowel drilling by locking the drill into the desired position. The body 12 of the boring tool 10 as illustrated and described herein is a rectangular shape, although other configurations which provide the locking as described herein, can be used. The boring tool 10 body 12 is manufactured from cast or machined plastics, metal, or any equivalent material which maintains structural integrity during use, with a drill entry 16 drilled into the top end 18 and a drill exit 20 milled into the bottom end 22. The body 12 is provided with a guide panel 14 which extends at a predetermined angle from the bottom end 22. Although the guide panel 14 is generally at a right angle to the bottom end 22, other angles can be manufactured, dependent upon the end use. The guide panel 14 can either be a separate piece affixed to the body 12 or manufactured as one piece and milled to the correct configuration. In the embodiment utilizing the single piece, the boring tool 10 is manufactured in the desired length, including guide panel 14. The excess is then cut away to provide the desired angle. Separate manufacture of the body and panel provide the advantage of economical assembly and manufacture as well as angle selection. The panel can be affixed through use of suitable screws to allow for mounting at predetermined locations. Optimally the guide panel 14 is provided with markings 52 to indicate the center point and distances therefrom. A further advantage to accurate measuring is provided by the placement of at least one measuring mark 54 on the bottom end 22. Exact placement of these, and other, markings will be apparent to those skilled in the art.

The drill channel 24 is preferably centered along the length of the body 12, to allow for the drill entry 16 and the drill exit 20 to be in a direct line. If the drill channel 24 is off-center, the angle of the dowel hole will be equally off-center. This may, however, be desirable, dependent upon the final application. The drill channel 24 is manufactured in two diameters, producing an upper channel 26 and a lower channel 28. The lower channel 28 must have a diameter sufficient to allow for free passage of the drill bit 32. A lower shaft bearing 30, having a diameter slightly less than the diameter of the upper channel 26, is placed into the upper channel 26 until it is stopped by the reduced diameter of the lower channel 28. The lower shaft bearing 30 is locked into place through use of a locking channel 34. The locking channel 34 is dimensioned to accommodate a hex screw, or equivalent locking device. The locking channel 34 is tapped into the body 12 in a position to come in contact with approximately the center of the lower shaft bearing 30. The hex screw 36 locks the lower shaft bearing 30 in place, preventing any shifting during use or slippage during removal of the drill. Although only locking channel 42 is illustrated herein, multiple locking channels for the upper shaft bearing 38 can be provided. The multiple locking channels allow for more versatility in the use of the boring tool 10 by allowing for the drilling to various depths. The upper and lower shaft bearings 30 and 38 must have an outer diameter which allows for a slight friction fit within the upper channel 26. The slight friction fit minimizes the amount of horizontal movement.

A second, upper shaft bearing 38 is also used, and maintained in place through spring 40. The upper shaft bearing 38 is preferably positioned along the upper channel 26 as determined by the ratios set forth below. The upper shaft bearing 38 is maintained in position through use of an upper locking channel 42 and hex screw 44. The upper locking channel 42 and lower locking channel 34 are preferably dimensioned to allow for the hex screws to be interchangeable. The spring 40 maintains the predetermined distance between the upper and lower shaft bearings 30 and 38. The spring 40 must have an interior diameter which allows for the shaft 46 to move freely without binding, with minimum side to side movement.

Figure 4:
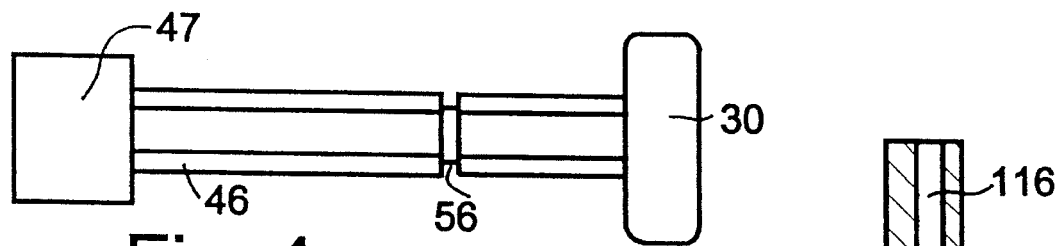
FIG. 4 is a side side view of a portion of the shaft and bearing.

The shaft 46 used herein and illustrated in more detail in FIG. 4, is provided with a groove 56. The groove 56 is dimensioned to receive a standard C-ring 58. The spring 40 is secured, through use of the C-ring 58, to the shaft 46. The C-ring 58 serves to retain the shaft 46 within the upper channel 26. Without the C-ring 58, the shaft 46 would be able to freely retract through the upper shaft bearing 38 and fall out. The shaft 46 can be of manufacture from any durable material, such as steel, aluminum or suitable alloy. The shaft 46 configuration is illustrated as a hexagonal shape, but can be other shapes for manufacturing, which works in combination with the interior of the bearings to prevent shaft to bearing rotation.

It is critical to have both the upper shaft bearing 38 and the lower shaft bearing 30 to prevent any side to side movement, that is, movement of the longitudinal axis of the drill bit. To prevent movement, the tolerance in fit between the interior of the bearings and the outer surface of the shaft must be as close as possible while allowing vertical movement of the shaft. Extremely close tolerance is possible because the bearings rotate so that the only relative movement is an axial sliding motion. Otherwise, rotational clearance would be required and wear would be dramatically greater. The minimal tolerance, shown as 60 in FIG. 3 creates a high surface to surface contact, minimizing wear on both the shaft 46 and the bearings 30 and 38. The upper shaft bearing 38 should be spaced from the lower shaft bearing 30 approximately the depth of the bore hole plus the length of the compressed spring 40. This allows the dowel hole to drill a predetermined depth.

To assemble the unit 10 for use the lower shaft bearing 30 is inserted in the unit 10 to the down-step 50 (as shown in FIG. 2) created by the holes and secured with set screw 36. The C-ring 58 is placed in groove 56. The other bearing 38 is placed on the shaft 46, opposite the drill bit 32. The spring 40 is placed on the opposite end. The shaft is then inserted in the body 10 and through bearing 30. After inserting, the depth is set by positioning bearing 38 and locked into position with set screw 44. The drill is then installed on the shaft 46 and secured in a conventional manner.

Figure 7:
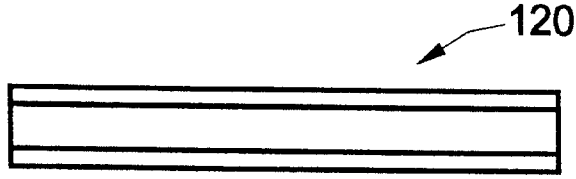
FIG. 7 is a top view of a hexagonal tool.

To use the boring tool 10, the material to be bored is aligned in the finished position and marked in the usual manner. The pieces are separated and the guide panel 14 of the boring tool 10 is placed against the material, aligning the center point marking 52 with the mark on the material. The boring tool 10 can be clamped in position, if so desired, to prevent any misalignment. A conventional ¼" hexagonal tool 120, illustrated in FIG. 7 is chucked in a drill. The end of the hexagonal tool is placed in the shaft recess and pressure is applied until the mechanical stop is reached. When the drill is removed spring 40 retracts the shaft into the tool body.

Figure 5:
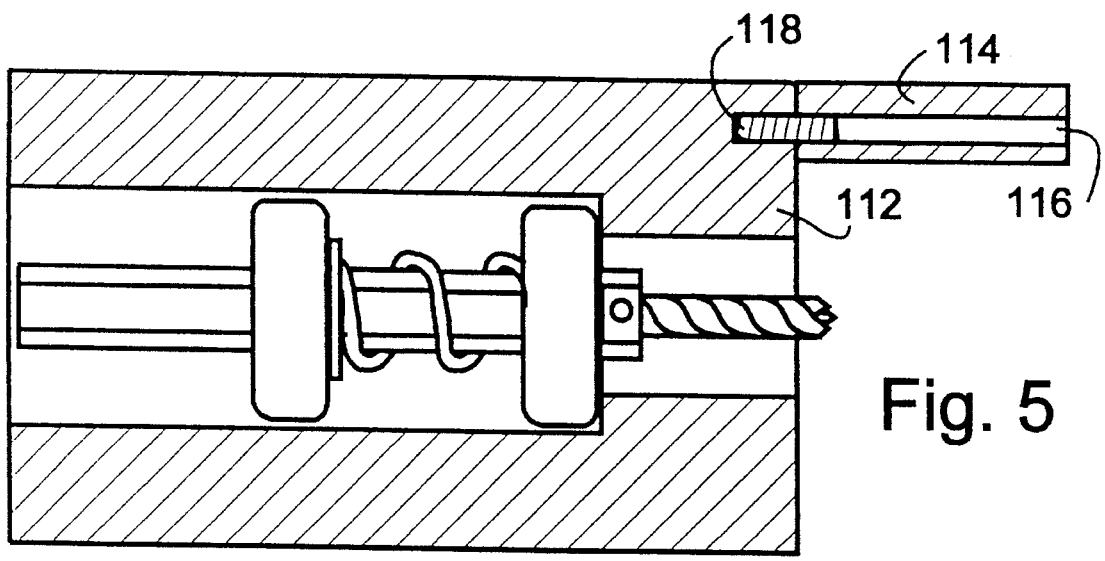
FIG. 5 is an alternate embodiment of the invention with a removable guide panel.
Figure 6:
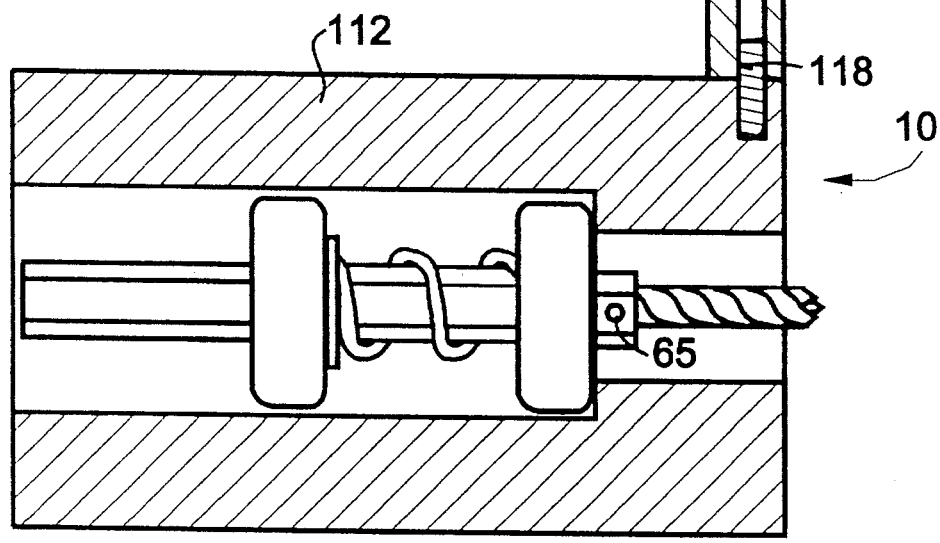
FIG. 6 is an alternate embodiment of FIG. 5.

Alternate embodiments to the body 12 are illustrated in FIGS. 5 and 6. In these embodiments, the guide panel 114 is manufactured separate from the body 112. The guide panel 114 is provided with mounting channels 116 to receive a hex nut equivalent. The body 112 is provided with corresponding receiving channels 118 to secure the guide panel 114 to the body 112 at the desired angle. The number of mounting channels 116 and receiving channels 118 are dependent upon the length of the body 112 and panel 114. Although only one location is illustrated in each of the Figures, multiple locations can be provided on each body 112 with the receiving channels 118 and mounting channels 116 being staggered to prevent overlapping of the receiving channels 118.

It is preferable that the end of the shaft 46 have a conventional swivel type head 47 at one end to reduce side pressure on the shaft. This type of tool allows the drill to be at a slight angle while without affecting the drill bit.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A dowel-hole boring device for boring dowel receiving holes at a predetermined angle and depth having:

a body, said body having a first end and a second end;

a first interior channel, said first interior channel being open to said first end;

a second interior channel, said second interior channel being open to said second end and contiguous to said first interior channel;

a pair of bearings, said pair of bearings having an interior diameter and an exterior diameter, said exterior diameter being dimensioned to fit within said first interior channel;

a shaft, said shaft being dimensioned to fit within the interior diameter of said pair of bearings to prevent relative rotation between said shaft and inner races of said bearings, having a drill bit receiving means at one end and a receiving groove;

a spring, said spring separating said pair of bearings a predetermined distance from one another.

2. The dowel-hole boring device of claim 1 further comprising a drill bit, said drill bit being secured to said one end of said shaft.

3. The dowel-hole boring device of claim 1 further comprising locking channels and locking means, said locking channels being at right angles to said first interior channel and extending from the exterior of said body to said first interior channel and dimensioned to receive said locking means, said locking means extending through said locking channels and being in contact with said pair of bearings, thereby locking said pair of bearings in place, said shaft being axially movable within said bearings.

4. The dowel-hole boring device of claim 1 wherein said second interior channel has a diameter less than said first interior channel.

5. The dowel-hole boring device of claim 4 wherein the reduction in diameter between said first interior channel and said second interior channel forms a step.

6. The dowel-hole boring device of claim 5 wherein one of said pair of bearings is adjacent said step.

7. The dowel-hole boring device of claim 1 further comprising a guide panel, said guide panel being proximate said second end.

8. The dowel-hole boring device of claim 7 wherein said guide panel is at an angle to said second end.

9. The dowel-hole boring device of claim 7 wherein said guide panel is on the same plane as said second end.

10. The dowel-hole boring device of claim 7 wherein said guide panel is removably attached to said body.

11. The dowel-hole boring device of claim 1 wherein said securing means is a C-ring.

12. The dowel-hole boring device of claim 1 wherein said shaft further comprises a recess, said recess allowing a drive shaft from a drill to securely rest in said recess, whereby angling said drive shaft will not change the angle of said shaft.

13. A dowel-hole boring device for boring dowel receiving holes at a predetermined angle and depth having:

a body, said body having a first end and a second end;

a guide panel, said guide panel being proximate said second;

a first interior channel, said first interior channel being open to said first end;

a second interior channel, said second interior channel being open to said second end and extending to be contiguous with said first interior channel and having a diameter less than said first interior channel to form a step;

a pair of bearings, said pair of bearings having an interior diameter and an exterior diameter, said exterior diameter being dimensioned to fit within said first interior channel, one of said pair of bearings being adjacent said step;

a shaft, said shaft being dimensioned to fit within the interior diameter of said pair of bearings, said shaft having a notched receiving groove, a securing clamp, a recess and a bit receiving area;

a spring said spring separating said pair of bearings a predetermined distance from one another and providing pressure to retract said shaft after the hole has been drilled;

at least a pair of locking channels, said locking channels being at right angles to said first interior channel and extending from the exterior of said body to said first interior channel and dimensioned to receive locking means, said locking means extending through said locking channels and being in contact with said pair of bearings, thereby locking said pair of bearings in place.

14. The dowel-hole boring device of claim 13 further comprising a drill bit, said drill bit being secured within said bit receiving area.

15. The dowel-hole boring device of claim 13 wherein said guide panel is at an angle to said second end.

16. The method of boring a hole in material at a predetermined angle and depth using a dowel-hole boring device for boring dowel receiving holes at a predetermined angle having:

a body, said body having a first end and a second end;

a guide panel, said guide panel being proximate said second end;

a first interior channel, said first interior channel being open to said first end;

a second interior channel, said second interior channel being open to said second end and extending to be contiguous with said first interior channel and having a diameter less than said first interior channel to form a step;

a pair of bearings, said pair of bearings having an interior diameter and an exterior diameter, said exterior diameter being dimensioned to fit within said first interior channel, one of said pair of bearings being adjacent said step;

a shaft, said shaft being dimensioned to fit within the interior diameter of said pair of bearings, said shaft having a circumferential channel;

a spring, said spring separating said pair of bearings a predetermined distance from one another;

at least a pair of locking channels, said locking channels being at right angles to said first interior channel and extending from the exterior of said body to said first interior channel and dimensioned to receive locking means, said locking means extending through said locking channels and being in contact with said pair of bearings, thereby locking said pair of bearings in place, comprising the steps of:

locking a drill bit into said shaft;

placing the first of said pair of bearings in said first interior channel;

placing said spring on said shaft;

placing the second of said pair of bearings on said shaft;

placing the combination of said bearings and shaft into said first interior channel until said spring comes in contact with said first bearing;

locking said pair of bearings in place using said locking means;

affixing a drill to said shaft;

pressing said drill until the hole is drilled;

withdrawing said drill.

\* \* \* \* \*